(12) United States Patent
Sasaki et al.

(10) Patent No.: US 6,617,796 B2
(45) Date of Patent: Sep. 9, 2003

(54) PUMPING CIRCUIT AND FLAT PANEL DISPLAY DEVICE

(75) Inventors: Yasushi Sasaki, Saitama-ken (JP); Masaki Miyatake, Saitama-ken (JP); Hajime Sato, Saitama-ken (JP); Takanori Tsunashima, Saitama-ken (JP); Yasuyuki Hanazawa, Saitama-ken (JP); Hoko Hirai, Saitama-ken (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/867,463

(22) Filed: May 31, 2001

(65) Prior Publication Data

US 2002/0011798 A1 Jan. 31, 2002

(30) Foreign Application Priority Data

May 31, 2000 (JP) .......................................... 2000-162780
Jan. 11, 2001 (JP) .......................................... 2001-004163

(51) Int. Cl.$^7$ ................................................. G09G 3/10
(52) U.S. Cl. .......................... 315/169.1; 345/80; 345/92; 345/204
(58) Field of Search .......................... 315/169.3, 169.4, 315/169.1; 345/204, 211, 50, 52, 54, 92, 76, 80, 206

(56) References Cited

U.S. PATENT DOCUMENTS 5,113,181 A * 5/1992 Inoue et al. ................... 345/84
6,236,394 B1 * 5/2001 Ikeda ........................... 345/211

FOREIGN PATENT DOCUMENTS

JP  05-300727  11/1993

* cited by examiner

Primary Examiner—Don Wong
Assistant Examiner—Thuy Vinh Tran
(74) Attorney, Agent, or Firm—Oblon, Spivak, McClelland, Maier & Neustadt, P.C.

(57) ABSTRACT

In a flat panel display device in which driving circuits and the like are arranged on an array substrate, a technology to realize a compact size and a low cost of an external control circuit is disclosed. At least one pumping circuit included in the external control circuit is arranged on the array substrate, and an output side capacitor connected between an output portion of the pumping circuit and the ground GND and an input side capacitor of a clock input portion are arranged outside the array substrate.

15 Claims, 12 Drawing Sheets

Vs (10V)

0V

VDD1-Vth+ αVs (18V)

VDD1-Vth(8V)

0V

VDD1-2Vth+ αVs (16V)

VDD1-2Vth

0V

Vs(10V) / 0V

Vs(10V) / 0V (20V) / VDD+Vs−|VTh|(18V) / (10V) / VDD−|VTh|(8V) / 0V

VDD+Vs(20V) / VDD(10V) / 0V

VDD+Vs(20V) / 0V

PUMPING CIRCUIT AND FLAT PANEL DISPLAY DEVICE

CROSS-REFERENCE TO RELATED APPLICATION

This application is based upon and claims the benefit of priority under 35USC §119 to Japanese Patent Application No.2000-162780, filed May 31, 2000 and No.2001-4163, filed Jan. 11, 2001; the entire contents of which are incorporated herein by reference.

BACKGROUND OF THE INVENTION

1. Field of the Invention

The present invention relates to a flat panel display device in which a pixel portion and a driving circuit for driving the pixel portion are integrally formed on the same substrate, and to a pumping circuit used for the flat panel display device.

2. Description of the Related Art

In recent years, an active matrix type liquid crystal display device in which a TFT (a thin film transistor) is disposed for each pixel as a switching element has come to a mainstream of a flat panel display device. Development of a liquid crystal display device has been lately progressed, in which a driving circuit and a power source circuit are integrally formed on an array substrate having a pixel portion formed thereon.

In the liquid crystal display device of such a kind, various kinds of clock signals and a power source voltage are supplied from an external control circuit to the driving circuit and the power source circuit on the array substrate. At present, in order to make the external control circuit in a compact size, it has been investigated to arrange a pumping circuit, which is included in the external control circuit, on the array substrate. However, since a capacitor having a large capacitance, which is necessary for the pumping circuit, cannot be formed on the array substrate in present fabrication processes, the external control circuit cannot be made in a more compact size. Furthermore, if the pumping circuit can be fabricated in the same fabrication processes as those for fabricating the pixel portion and the driving circuit, the pumping circuit can be fabricated in cost lower than a case where the pumping circuit is mounted on the external control circuit. Nevertheless, as described above, since the pumping circuit cannot be formed on the array substrate, it is impossible to fabricate the pumping circuit in low cost.

On the other hand, an operation to form a TFT on a glass plate like an array substrate makes fabrication processes difficult, and transistor characteristic are made to be unstable in many cases. Accordingly, when the pumping circuit is formed on the array substrate, the characteristics of the TFT constituting the circuit are expected to become unstable. In this case, a problem that variations in a threshold occur and an output voltage from the pumping circuit becomes unstable is caused.

Furthermore, when the TFT on the array substrate is formed of polycrystalline Si, performance of the TFT formed of the polycrystalline Si is inferior to that formed of a single crystal Si. When a gate length of the TFT formed of the polycrystalline Si is made to be longer to compensate the inferiority to the TFT formed of the single crystal Si, an area required to a circuit arrangement becomes large. Accordingly, in the case where the pumping circuit arranged on the array substrate is constituted of the TFT, a problem that a fringe region around the pixel portion becomes large is caused.

SUMMARY OF THE INVENTION

The object of the present invention is to provide a flat panel display device, which achieves a compact sized and low cost external control circuit.

Another object of the present invention is to provide a pumping circuit capable of stabilizing an output voltage therefrom without being influenced by TFT fabrication processes.

Still another object of the present invention is to provide a flat panel display device capable of arranging a pumping circuit on an array substrate without enlarging a fringe region thereof.

To achieve the above-described objects of the present invention, a first aspect of the present invention is a flat panel display device which comprises: a first substrate including a plurality of scanning lines, and a plurality of signal lines intersecting the scanning lines, a switching element arranged on an intersection point of each of the scanning lines and the signal lines, a pixel electrode connected to the switching element; a second substrate including an opposite electrode opposite to the pixel electrode; a display layer held between said first and second substrates; a data driver which supplies a data signal to each of the signal lines; and a scan driver which supplies a scanning signal to each of the scanning lines, wherein a control signal and a power source voltage are supplied from an external control circuit to the data driver and the scan driver, and wherein a control signal and a power source voltage from an external control circuit are supplied to the data driver and the scan driver, and wherein at least one pumping circuit included in the external control circuit is arranged on the first substrate, and a first capacitor connected to a clock input portion of the pumping circuit and a second capacitor connected between an output portion and the ground are arranged outside the first substrate.

To achieve another object of the present invention, a second aspect of the present invention is a pumping circuit which comprises a first transistor having a first electrode region and a third electrode region supplied with a power source voltage and a second electrode region connected to a potential of a first intermediate node; a second transistor having a first electrode region supplied with the power source voltage, a second electrode region connected to a potential of a second intermediate node and a third electrode region connected to the potential of the first intermediate node; and a third transistor having a first electrode region connected to the potential of the second intermediate node, a second electrode region connected to an output portion together with a third capacitor, and a third electrode region connected to the potential of the first intermediate node, wherein a first clock input portion for receiving a first clock signal through a first capacitor is connected to the first intermediate node, and a second input portion for receiving a second clock signal through a second capacitor is connected to the second intermediate node.

To achieve another object of the present invention, a third aspect of the present invention is a pumping circuit, wherein a first transistor of a first conductivity type and a second transistor of a second conductivity type are connected in series, and two transistor pairs, each being composed of the first and second transistor, are connected in series.

To achieve another object of the present invention, a fourth aspect of the present invention is a pumping circuit, wherein a first transistor of a first conductivity type and a second transistor of a second conductivity type are connected in parallel, and two transistor pairs, each being composed of the first and second transistors, are in series.

To achieve another object of the present invention, a fifth aspect of the present invention is a pumping circuit comprises: a first pumping circuit in which a first transistor of a first conductivity type and a second transistor of a second conductivity type are connected in series, and two transistor pairs, each being composed of the first and second transistors, are in series connected; a second pumping circuit in which a first transistor of the second conductivity type and a second transistor of the first conductivity type are connected in series, and two transistor pairs, each being composed of the first and second transistors, are in series connected; and an operational amplifier which receives an output from the first pumping circuit as a positive polarity power source and an output from the second pumping circuit as a negative polarity power source.

To achieve still another object of the present invention, a sixth aspect of the present invention is a flat panel display device which comprises: a first substrate including a plurality of scanning lines, and a plurality of signal lines intersecting the scanning lines, a switching element arranged on an intersection point of each of the scanning lines and the signal lines, a pixel electrode connected to the switching element; a second substrate including an opposite electrode opposite to the pixel electrode; a display layer held between said first and second substrates; a data driver which supplies a data signal to each of the signal lines; and a scan driver which supplies a scanning signal to each of the scanning lines, wherein a control signal and a power source voltage from an external control circuit are supplied to the data driver and the scan driver, and wherein at least one pumping circuit included in the external control circuit is arranged in an area opposite to an area in which the scan driver on the first substrate is arranged.

In one preferred embodiment of the present invention, the first substrate is an array substrate, and the second substrate is an opposite substrate. The display layer is either a liquid crystal layer or a fluorescent light emission layer.

The first capacitor is an input side capacitor, and the second capacitor is an output side capacitor.

In one preferred embodiment of the present invention, the first electrode region is a source electrode, a second electrode region is a drain electrode, and the third electrode region is a gate electrode. The first intermediate node is a node pg, and the second intermediate node is a node ps.

Furthermore, the first and second conductivity types are opposite types to each other. Specifically, if the first conductivity type is an n type, the second conductivity type is a p type. If the first conductivity type is the p type, the second conductivity type is the n type.

DETAILED DESCRIPTION OF THE PREFERRED EMBODIMENTS

Preferred embodiments of the present invention will be described with reference to the accompanying drawings below. Herein, descriptions are made for a pumping circuit and a flat panel display device of the present invention when the pumping circuit and the flat panel display device are applied to an active matrix type liquid crystal display device.

Embodiment 1

Figure 1:
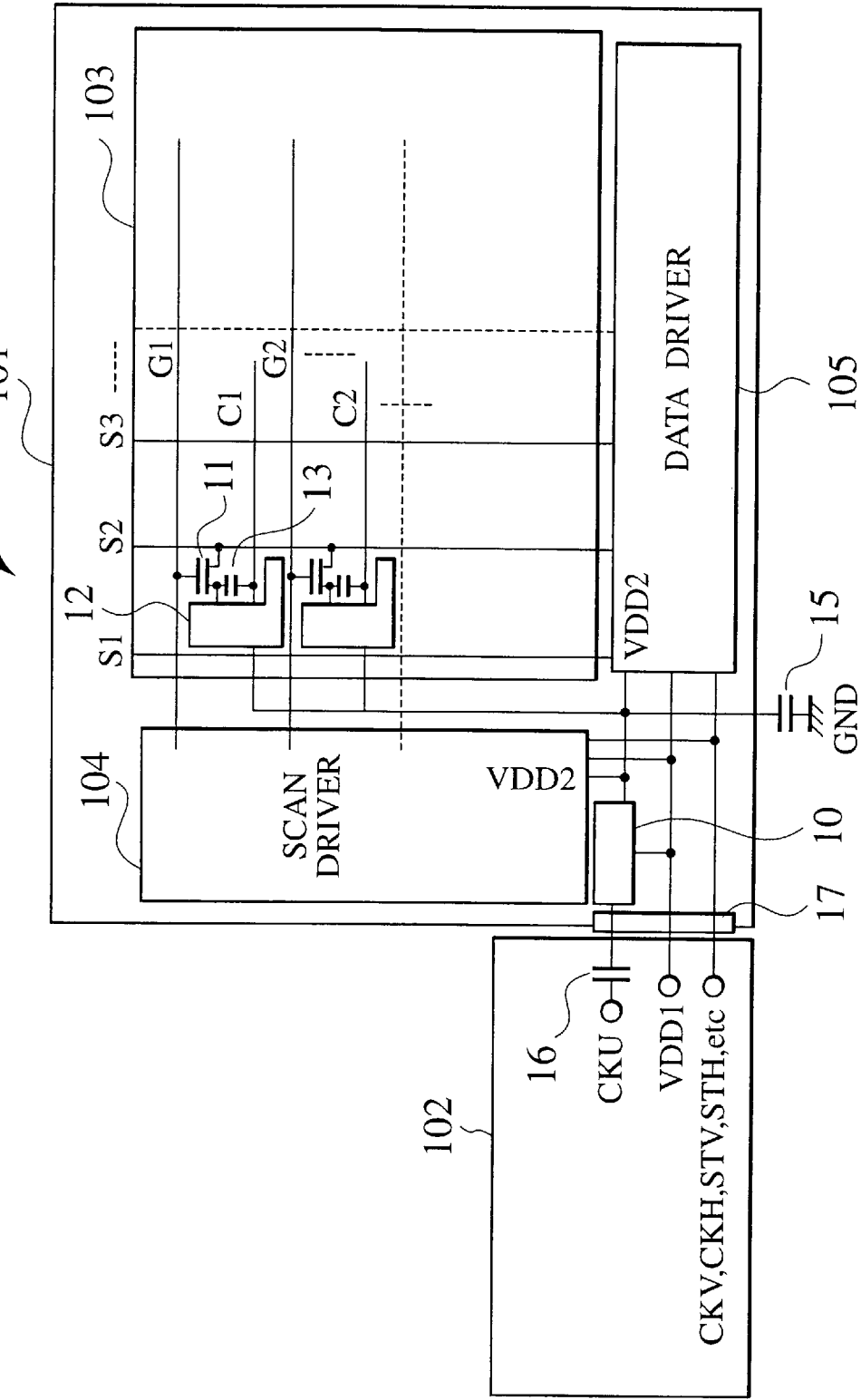
FIG. 1 is a circuit diagram of a liquid crystal display device according to a first embodiment of the present invention.

FIG. 1 is a circuit diagram of a liquid crystal display device according to a first embodiment of the present invention. In FIG. 1, illustrations of an array substrate and an opposite substrate arranged oppositely to the array substrate are omitted.

On an array substrate 101, arranged are a pixel portion 103, a scan driver 104, a data driver 105 and a pumping circuit 10.

A plurality of signal lines S1, S2, S3, . . . (hereinafter generically referred to as S) and a plurality of scanning lines G1, G2, . . . (hereinafter generically referred to as G), which intersect with each other, are arranged in the pixel portion 103. A TFT 11 is connected to an intersection point of each of the signal lines and the scanning lines. The signal lines and the scanning lines G are electrically isolated from each other by an insulating film (not shown).

A source electrode of the TFT 11 is connected to the signal line S, and a drain electrode thereof is connected to a pixel electrode 12. Each pixel electrode 12 corresponds to a plurality of pixels constituting the pixel portion 103. An opposite electrode (not shown) opposite to corresponding one of the pixel electrodes 12 is formed on an opposite substrate side (not shown). A common voltage is applied to the opposite electrode (not shown) from an external control circuit 102. A liquid crystal layer (not shown) as a display layer is held between the pixel electrode 12 and the opposite electrode (not shown).

An auxiliary capacitor 13 is in parallel connected to the pixel electrode 12 to keep a potential relation with the opposite electrode. The auxiliary capacitor 13 forms a capacitance Cs between the pixel electrode 12 and each of auxiliary capacitor lines C1, C2, - - - (hereinafter generically referred to as C). The auxiliary capacitor line C is connected to the auxiliary capacitor 13 of each pixel. A constant voltage is applied to the auxiliary capacitor line C from the external control circuit 102.

The scan driver 104 outputs scanning signals for one horizontal scanning period in the order of the scanning lines G1, G2, - - - A vertical clock signal CKV and a vertical start signal STV are supplied to the scan driver 104 from the external control circuit 102. The vertical start signal STV is sequentially shifted by a shift register (not shown) in synchronization with the vertical clock signal CKV. An output from the shift register is level-converted to a required voltage by a level shift circuit (not shown), and power-amplified by a buffer (not shown). Thereafter, the output from the shift register, which has been level-converted and power-amplified, is sequentially output to the corresponding scanning lines G1, G2, - - - as a scanning signal.

The data driver 105 controls a turning on/off of an analog switches (not shown) and samples video data supplied to a video bus (not shown) on the signal lines S1, S2, S3, - - - Then, the video data is held for a certain period of time. Video data, a horizontal clock signal CKH and a horizontal start signal STH are supplied from the external control circuit 102 to the data driver 105. The horizontal start signal STH is sequentially shifted by a shift register (not shown) in synchronization with the horizontal clock signal CKH. The analog switches are sequentially turned on by outputs from the shift register, and video data is sampled on the signal lines S1, S2, S3, - - - Then, the video data is held for a certain period of time. It should be noted that the driving system for driving the data driver might be a digital/analog conversion system in addition to the analog sample hold system of this embodiment.

The scan driver 104 and the data driver 105 are drives by power source voltages VDD1 and VDD2. The power source voltage VDD1 is supplied from a pumping circuit (not shown) for the power source voltage VDD1, which is arranged in the external control circuit 102. The power source voltage VDD2 is supplied from the pumping circuit 10 for the power source voltage VDD2, which is arranged on the array substrate 101.

The pumping circuit 10 receives the power source supply of VDD1 from the external control circuit 102. The power source voltage VDD1 is boosted to the power supply voltage VDD2 by the pumping circuit 10, and supplied to the scan driver 104 and the data driver 105.

An output side capacitor 15 provided between an output portion of the pumping circuit 10 and the ground potential GND, and an input side capacitor 16 provided in a clock input portion of the pumping circuit 10 are arranged outside of the array substrate 101. These capacitors are provided to lessen a variation of an output voltage, and should have a large capacitance. In this embodiment, the output side capacitor 15 and the input side capacitor 16 are both arranged in the external control circuit 102. Note that, in FIG. 1, the output side capacitor 15 is illustrated outside of the external control circuit 102 to make it easy to understand the relation between the output portion of the pumping circuit 10 and the ground. Describing a constitution of the output side capacitor 15, the following constitution is conceived. For example, a wiring from the output portion of the pumping circuit 10 is guided to the external control circuit 102 through an electrode pad 17, and the output side capacitor 15 is formed between the wiring and the ground potential GND provided inside the external control circuit 102. Note that the output side capacitor 15 and the input side capacitor 16 should be arranged outside the array substrate 101 and both of them need not to be arranged inside the external control circuit 102. For example, the output side capacitor 15 may be arranged inside the external control circuit 102, and the input side capacitor 16 may be arranged outside the external control circuit 102. Alternatively, the input side capacitor 16 may be arranged inside the external control circuit 102, and the output side capacitor 15 may be arranged outside the external control circuit 102.

The output side capacitor 15 is connected to the auxiliary capacitor 13 of each pixel through the auxiliary capacitor line C. In such a way, by connecting the auxiliary capacitor 13 fitted to each pixel and the output side capacitor 15 arranged outside the array substrate 101, a capacitance component of the output side capacitor 15 can be increased. Accordingly, the output voltage can be further stabilized. When the screen is made to have high density or to be large, if a total sum of the capacitances Cs of the auxiliary capacitors 13 is sufficiently large, a capacitance of the output side capacitor 15 arranged outside the array substrate 101 can be made small, or the output side capacitor 15 itself can be made unnecessary.

The external control circuit 102 is constituted of a control IC, a digital/analog converter (hereinafter referred to as a D/A converter), a level shift circuit, a pumping circuit and the like, which are not illustrated. The external control circuit 102 generates the vertical clock signal CKV, the vertical start signal STV, the horizontal clock signal CKH, the horizontal start signal STH, the clock signal CKU and the like based on a reference clock signal supplied from the outside and the like. The clock signal CKU among these signals is a clock signal for driving the pumping circuit 10. Furthermore, the external control circuit 102 converts digital video data supplied from the outside into analog video data. The pumping circuit for the power source voltage VDD1, which is arranged in the external control circuit 102, generates the power source voltage VDD1 based on a reference voltage supplied from the outside. In addition, the external control circuit 102 generates a common voltage to be supplied to an opposite electrode (not shown), a power source voltage VDDP for driving the pumping circuit 10 and the like. Note that a supply line used for supplying the power source voltage VDDP is not illustrated.

The external control circuit 102 and the array substrate 101 are connected by a flexible wiring substrate (not shown). The vertical clock signal CKV and the vertical start signal STV are supplied to the scan driver 104. The analog video data, the horizontal clock signal CKH and the horizontal start signal STH are supplied to the data driver 105. The clock signal CKU and the power source voltage VDDP are supplied to the pumping circuit 10. Note that, to simplify the drawing of FIG. 1, only one wiring is illustrated as supply lines for supplying these signal.

According to the liquid crystal display device 100 of the embodiment 1, since a location of the body of the pumping circuit 10 can moved from the external control circuit 102 onto the array substrate 101, the external control circuit 102 can be made to be compact in size. The body of the pumping circuit 10 can be fabricated in the same fabrication processes as those of the pixel portion 103, the scan driver 104 and the data driver 105. Therefore, the liquid crystal display device 100 can be fabricated in lower cost compared to the case where the pumping circuit 10 is arranged in the external control circuit 102.

Furthermore, in the liquid crystal display device 100 according to the embodiment 1, the output and input side capacitors 15 and 16 of the pumping circuit 10 can be designed so that they have a large capacitance. Accordingly, similarly to the case where the pumping circuit 10 is arranged in the external control circuit 102, the output voltage can be stabilized. Particularly, in the case where the liquid crystal display device 100 is constructed in such a way that the output side capacitor 15 is connected to the auxiliary capacitor 13 through the auxiliary capacitor line C, a capacitance component of the output side capacitor 15 can be increased. Accordingly, the output voltage can be further stabilized.

Specifically, in the liquid crystal display device 100 according to the embodiment 1, not only the output voltage from the pumping circuit 10 can be stabilized, but also the compact size and low cost of the external control circuit 102 can be realized.

To realize the compact size and low cost of the external control circuit 102, at least one pumping circuit included in the external control circuit 102 may be arranged on the array substrate 101, and the output side capacitor of this pumping circuit and the input side capacitor thereof may be arranged outside the array substrate 101. For example, the pumping circuit for the power source voltage VDD1 or other pumping circuits may be on the array substrate 101 instead of the pumping circuit 10 for the power source voltage VDD2. In addition, a plurality of these pumping circuits may be together arranged on the array substrate 101.

Figure 2A:
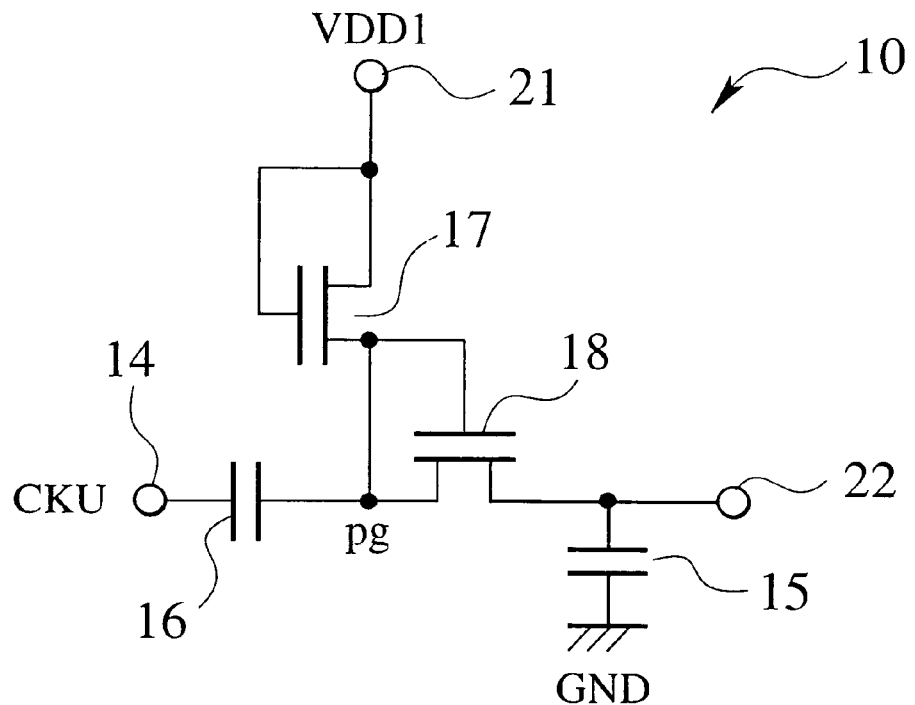
FIG. 2A is a circuit diagram of a pumping circuit shown in FIG. 1.
Figure 2B:
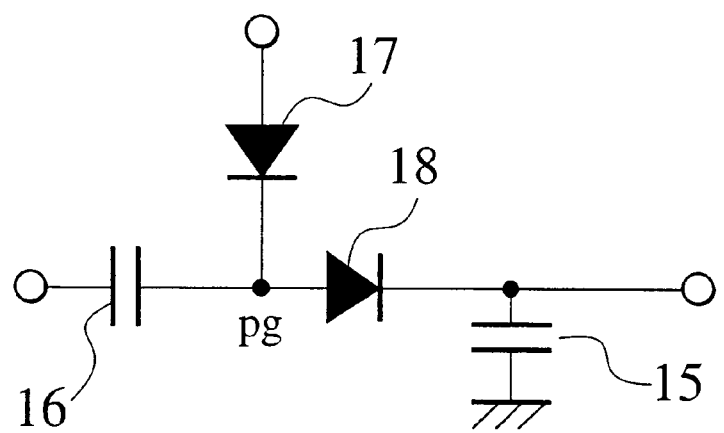
FIG. 2B is an equivalent circuit diagram of FIG. 2A.

Next, a circuit structure of the pumping circuit 10 and an operation thereof will be described. FIG. 2A is a circuit diagram of the pumping circuit 10, and FIG. 2B is an equivalent circuit diagram of the pumping circuit 10. In FIGS. 2A and 2B, the same constituent components as those in FIG. 1 are represented by the same reference numerals.

The pumping circuit 10 is constituted of two N channel TFTs 17 and 18, the output side capacitor 15 and the input side capacitor 16. A drain electrode side of the N channel TFT 17 is connected to source and gate electrodes of the N channel TFT 18. Furthermore, the output side capacitor 15 and the input side capacitor 16 are connected to a drain electrode of the N channel TFT 18 and the source electrode thereof, respectively. In the drawings, reference symbol pg denotes an intermediate node.

Figure 3A:
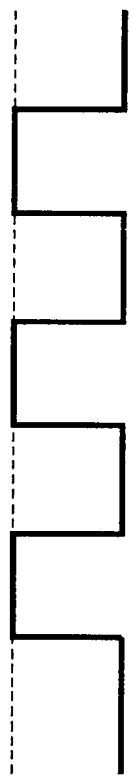
FIG. 3A to FIG. 3C are timing charts for explaining an operation of the pumping circuit shown in FIG. 2A.
Figure 3B:
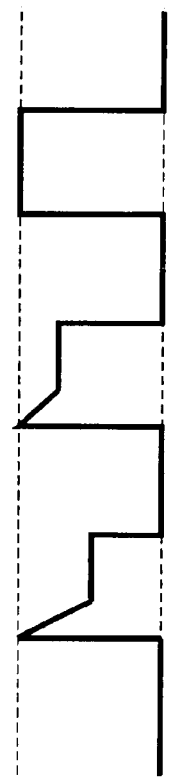
Figure 3C:
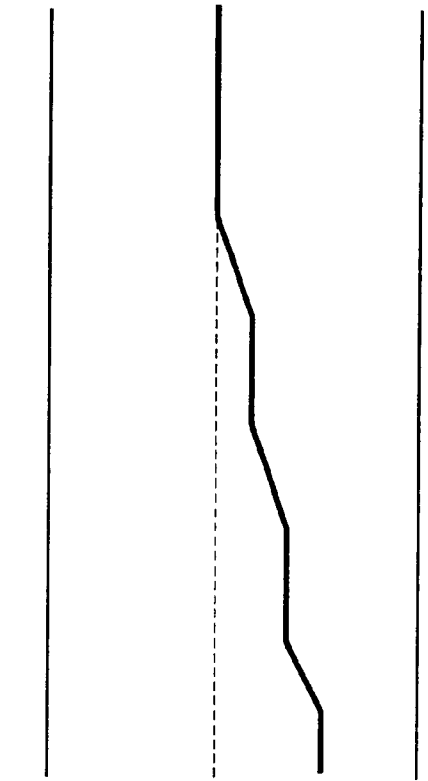

FIG. 3A to FIG. 3B are timing charts for explaining the operation of the pumping circuit 10. The operation of the pumping circuit 10 will be described with reference to FIG. 2 and FIG. 3 below.

First, the clock signal CKU having an amplitude Vs is input from the clock input portion 14. For example, a square wave having an amplitude of 10 V and a frequency of 1.5 MHz as shown in FIG. 3A is input. Moreover, for example, DC of 10 V (not shown) is input to the power source input portion 21 as the power source voltage VDD1.

In the intermediate node pg, the following voltage is maintained in accordance with a waveform of the input wave. Specifically, during a period of time when the clock signal CKU is not being input from the clock input portion 14, that is, during a period of time when the voltage is zero, a voltage obtained by subtracting the threshold Vth of the N channel TFT 17 from the power source voltage VDD1 is maintained. For example, assuming that the threshold Vth of the N channel TFT 17 be 2 V, the intermediate node pg is maintained at 8 V (VDD1−Vth). Furthermore, during a period of time when the clock signal CKU is being input from the clock input portion 14, that is, a period of time when the voltage is 10 V, a waveform having an amplitude boosted by a boosting ratio α is obtained. For example, when the boosting ratio α is 1, the waveform having an amplitude ranging from 8 V to 18 V, that is, VDD1−Vth+αVs, is obtained as a pulse waveform, as shown in FIG. 3B.

The waveform having the amplitude ranging from 8 V to 18 V means the one changing its amplitude between 8 V and 18 V. The voltage at the output portion 22 is gradually boosted as the clock signal CKU is input to the clock input portion 14. Finally, the output voltage having the amplitude equal to VDD1−2 Vth|αVs is obtained. For example, in FIG. 3C, when it is assumed that a threshold Vth of the N channel TFT 18 be 2 V, the output voltage of 16 V is obtained. This output voltage is output as the power source voltage TDD2 shown in FIG. 1.

Embodiment 2

In the embodiment 2, a constitution for stabilizing the output voltage of the pumping circuit, which is arranged on the array substrate, is described.

A basic constitution of a liquid crystal display device of the embodiment 2 is the same as that of the embodiment 1, and descriptions thereof are omitted. Herein, only a constitution of a portion characteristic of the charging pumping circuit according to the embodiment 2 is described.

Figure 4:
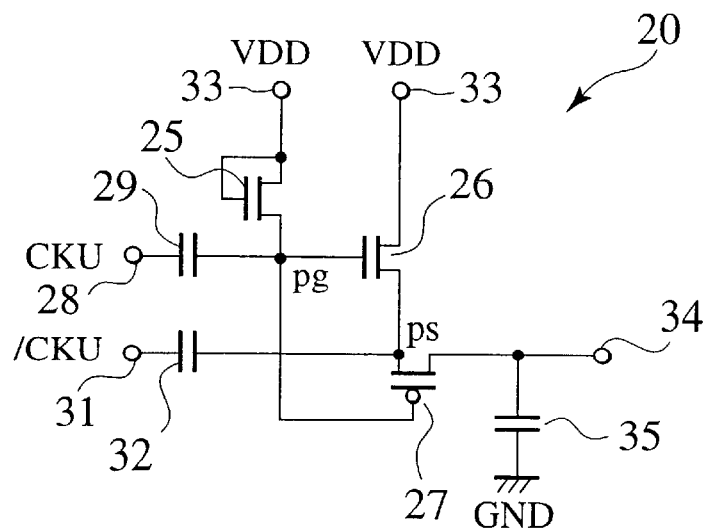
FIG. 4 is a circuit diagram of a pumping circuit according to a second embodiment of the present invention.

FIG. 4 is a circuit diagram of the pumping circuit according to the embodiment 2. The pumping circuit 20 of FIG. 4 is constituted by a N channel TFT 25, a N channel TFT 26, a P channel TFT 27, input side capacitors 29 and 32, and an output side capacitor 35.

The N channel TFT 26 and the P channel TFT 27 are connected in series. A drain electrode side of the N channel TFT 25 is connected to gate electrodes of the N channel TFT 26 and the P channel TFT 27 through an intermediate node pg. A clock signal CKU is supplied from a clock input portion 28 to the gate electrodes of the N and P channel TFTs 26 and 27 through the input side capacitor 29. An inverted clock signal /CKU obtained from the clock signal CKU is input from a clock input portion 31 to an intermediate node ps, which is an intermediate connection point of the N and P channel TFTs 26 and 27, through the input side capacitor 32.

In FIG. 4, the input side capacitors 29 and 32 correspond to the input side capacitor 16 of FIG. 1. The output side capacitor 35 provided between an output portion 34 and the ground GND corresponds to the output side capacitor 15 of FIG. 1. Moreover, a power source voltage VDD corresponds to the power source voltage VDD1 of FIG. 2A for example.

FIG. 5A to FIG. 5E are timing charts for explaining an operation of the pumping circuit 20. The operation of the pumping circuit 20 will be described with reference to FIG. 5 below.

Figure 5A:
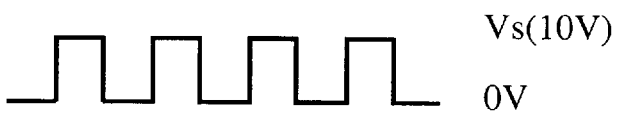
FIG. 5A to FIG. 5E are timing charts for explaining an operation of the pumping circuit shown in FIG. 4.
Figure 5B:

The clock signal CKU having an amplitude Vs is input from the clock input portion 28 to the pumping circuit 20, and the inverted clock signal /CKU having the same amplitude Vs is input from the clock input portion 31 thereto. For example, a square wave having the amplitude of 10 V as shown in FIG. 5A and a frequency of 1.5 MHz and a inverted square wave obtained from the square wave as shown in FIG. 5B are input. For example, DC of 10 V is input to an input portion 33 as the power source voltage VDD.

Figure 5C:
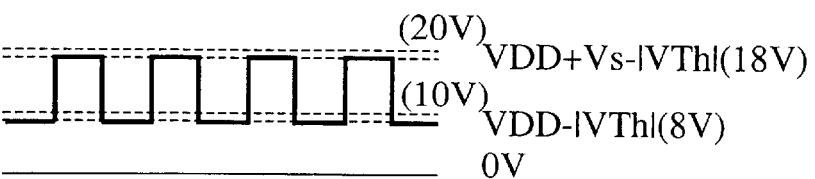
Figure 5D:
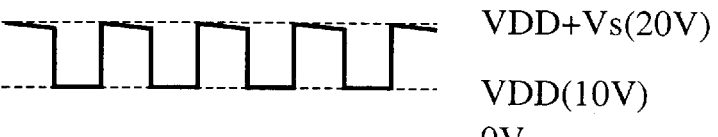
Figure 5E:

In the intermediate node pg, the following voltage is maintained in accordance with the clock signal CKU that is input to the pumping circuit 20. Specifically, during a period of time when the clock signal CKU is not being input, a voltage obtained by subtracting the threshold Vth of the N channel TFT 25 from the power source voltage VDD is maintained. For example, assuming that the threshold Vth of the N channel TFT 25 be 2 V, the intermediate node pg is maintained at 8 V (VDD−|Vth |) as shown in FIG. 5C. Furthermore, during a period of time when the clock signal CKU is being input, a waveform having an amplitude boosted in a boosting ratio a is obtained. For example, when the boosting ratio α is 1, the waveform having an amplitude ranging from 8 V to 18 V, that is, VDD+Vs−|Vth|, is obtained as shown in FIG. 5C. When the N channel TFT 26 is being turned on, that is, during a period of time when the clock signal CKU is equal to Vs, the intermediate node ps is maintained at the power source voltage VDD. For example, when the intermediate node pg is maintained at 18 V and the power source voltage VDD is equal to 10 V, the intermediate node ps is maintained at 10 V. On the other hand, when the N channel TFT 26 is being turned off, that is, during a period of time when the clock signal CKU is equal to 0 V, a potential of the clock signal CKU is raised by the amplitude Vs of the inverted clock signal /CKU at the rise of the clock signal CKU instantaneously, as shown in FIG. 5D. Thereafter, the potential drops. For example, when the amplitude of the inverted clock signal /CKU is equal to 10 V, the potential of the clock signal CKU is raised to 20 V (VDD+Vs) at the rise thereof instantaneously, and then drops gradually. When the P channel TFT 27 is turned on, that is, during a period of time when the inverted clock signal /CKU is equal to Vs, a current flows into the output portion 34 from the intermediate node ps, and the voltage (VDD+Vs) at the intermediate node ps at this time is the output voltage of the pumping circuit 20. For example, when the intermediate node pg is at 8 V and the intermediate node ps is at 20 V, the output voltage of 20 V is obtained.

In FIG. 4, when the threshold Vth of the N channel TFT 26 is larger than, for example, a design value due to a variation of a transistor characteristic, VDD−|Vth| becomes small. For this reason, since only by the output from the N channel TFT 26, the charging pumping circuit 20 cannot supply an output voltage that is originally required, the pumping circuit becomes incapable of allowing the driving circuits to operate normally. However, in the pumping circuit 20 of the embodiment 2, the potential is instantaneously raised by the amplitude of the inverted clock signal /CKU irrespective of the variation in the threshold Vth of the N channel TFT 26. Therefore, the voltage (VDD+Vs) at the intermediate node ps at this time is fetched out as the output voltage, whereby it is possible to obtain the output voltage that is always stable.

Accordingly, in the pumping circuit 20 according to the embodiment 2, the effect that the output voltage can be stabilized without being influenced by the fabrication processes of the TFT can be obtained in addition to the effect of the embodiment 1.

Embodiment 3

In the embodiment 3, descriptions for a constitution for stabilizing an output voltage of a pumping circuit arranged on an array substrate similarly to the embodiment 2 will be made.

A basic constitution of a liquid crystal display device according to the embodiment 3 is the same as that of the embodiment 1, and descriptions thereof are omitted. Herein, only a constitution characteristic of the pumping circuit according to the embodiment 3 will be described.

Figure 6:
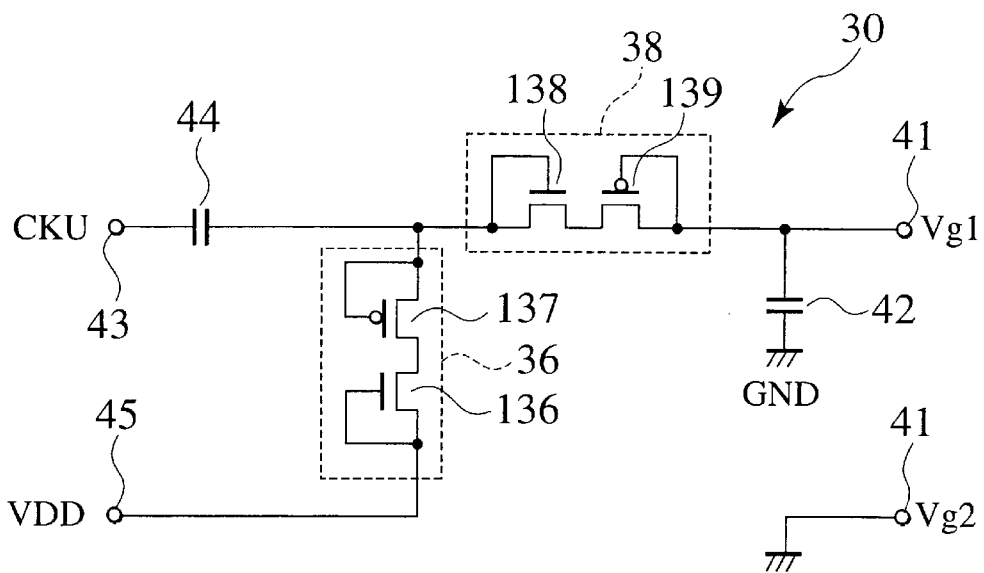
FIG. 6 is a circuit diagram of a pumping circuit according to a third embodiment of the present invention.

FIG. 6 is a circuit diagram of the pumping circuit according to the embodiment 3. The pumping circuit 30 is constituted of two diode circuits 36 and 38, an output side capacitor 42 and an input side capacitor 44. The diode circuit 36 is constituted of an N channel TFT 136 and a P channel TFT 137, which are connected in series. The diode circuit 38 is constituted of an N channel TFT 138 and a P channel TFT 139, which are connected in series. Furthermore, these two diode circuits 36 and 38 are connected to each other in series. VDD as a power source is input to an input portion 45 of the pumping circuit 30 from the outside, and a clock signal CKU is input to a clock input portion 43.

In FIG. 6, the input side capacitor 44 corresponds to the input side capacitor 16 of FIG. 1. The output side capacitor 42 provided between an output portion 41 and the ground GND corresponds to the output side capacitor 15 of FIG. 1.

In the diode circuit 36 and 38 constituted as described above, the threshold of two TFTs having the different polarities, which constitute the diode circuits, can be roughly represented as Vthn (Nch TFT)+Vthp (Pch TFT). Specifically, when the threshold of either the N channel TFT or the P channel TFT becomes different from a design value due to variations of the fabrication processes, a value of Vthn+Vthp is constant. Accordingly, in the pumping circuit 30 according to the embodiment 3, the output voltages Vg1 and Vg2 can be stabilized without being influenced by the TFT fabrication processes.

For example, in an experimental example in which the pumping circuit 30 of FIG. 6 was used, when Vthn was equal to 2.5 V and Vthp was equal to −1.5 V or when Vthn was equal to 1.5 V and Vth p was equal to −2.5 V, the same output voltage could be obtained.

Furthermore, as a comparison example, the two diode circuits 36 and 38 of FIG. 6 was constituted by P channel TFTs having the same polarity, and the two diode circuit 36 and 38 were allowed to operate under the same conditions. In this case, when Vthn was equal to 2.5 V and Vthp was equal to −1.5 V, the output voltage was made to be lower by 2 V than that when Vthn was equal to 1.5 V and Vthp was equal to −2.5 V. Thus, unevenness in display on the screen happened to appear.

Figure 7:
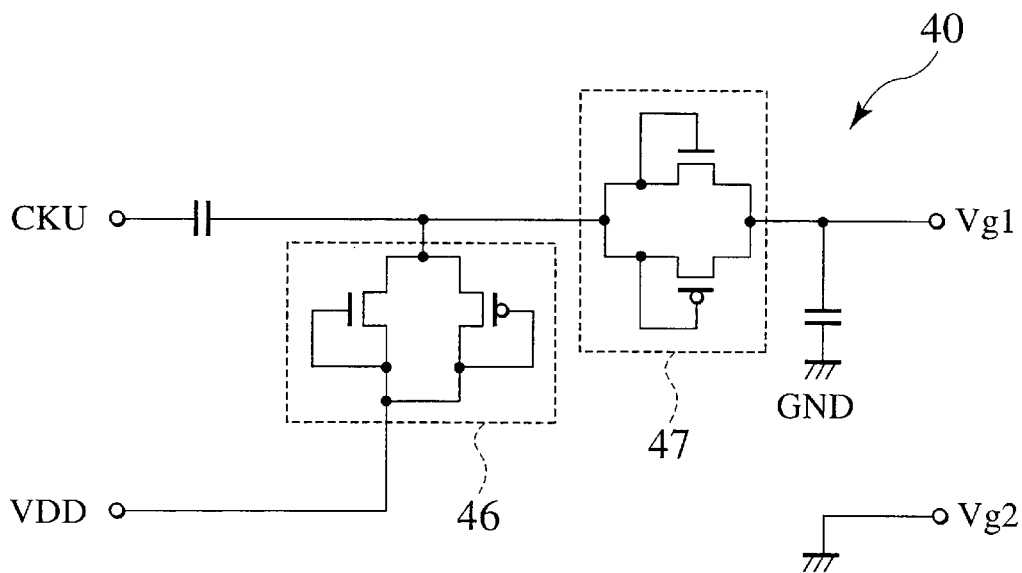
FIG. 7 is a circuit diagram showing another constitution example of the pumping circuit according to the third embodiment.

FIG. 7 is a circuit diagram showing another constitution example of the embodiment 3. In the pumping circuit 40 shown in FIG. 7, an N channel TFT and a P channel TFT are connected in parallel with each other, and two diode circuits 46 and 47, which are constituted of these TFTs, are in series connected to each other. When the pumping circuit 40 is constituted by the circuit structure shown in FIG. 7, the same effects as that of FIG. 6 can be obtained.

Figure 8:
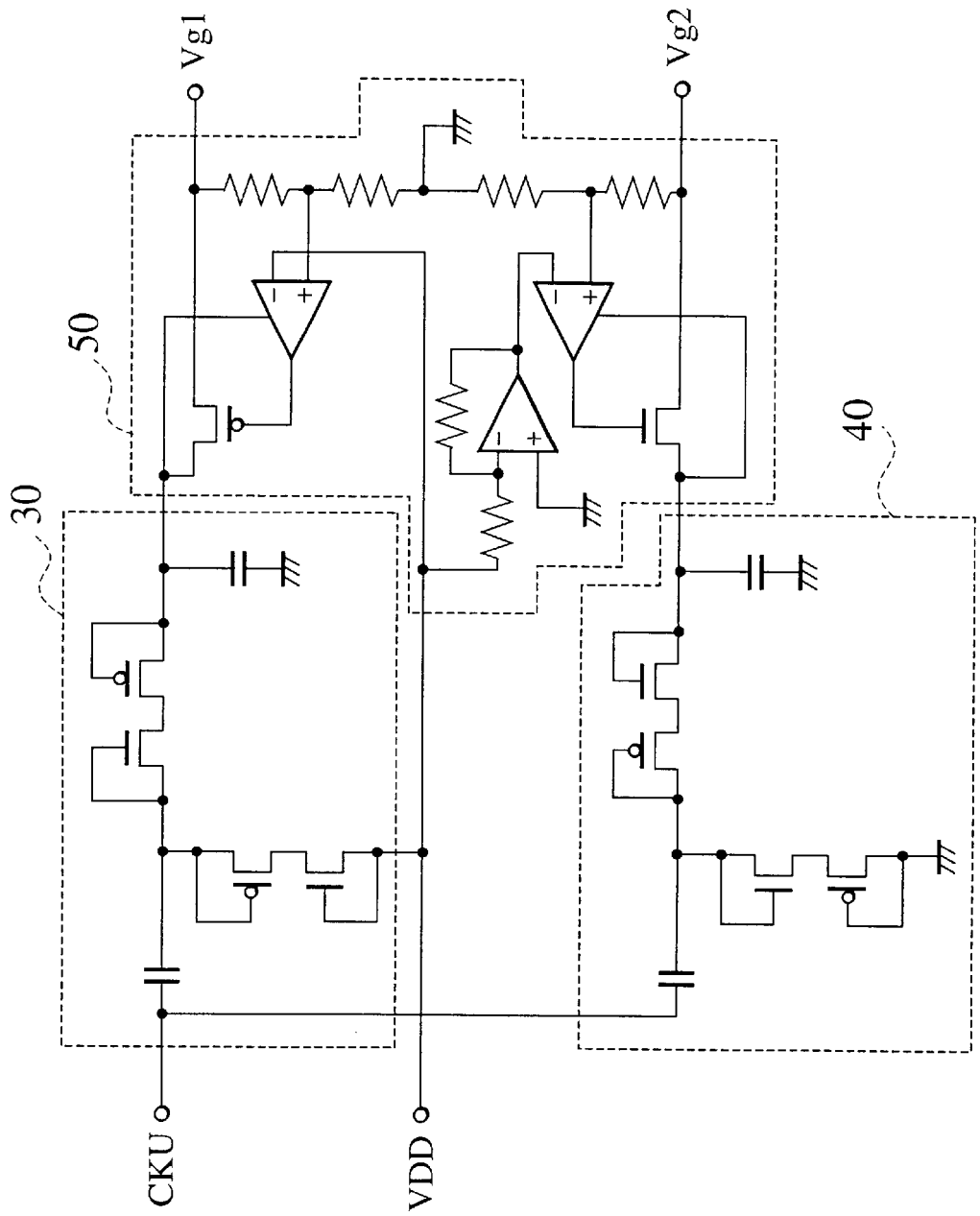
FIG. 8 is a circuit diagram showing still another constitution example of the pumping circuit according to the third embodiment.

FIG. 8 is a circuit diagram showing still another constitution example of the embodiment 3. FIG. 8 shows the constitution example in which the pumping circuit 40 and an operational amplifier 50 are connected to the pumping circuit 30 of FIG. 6.

The pumping circuit 40 has a circuit structure obtained by replacing the N channel TFT and the P channel TFT of the two diode circuits 36 and 38 included in the pumping circuit 30 respectively with the opposite polarity TFTs. The pumping circuit 30 generates an output voltage having a positive polarity, and the pumping circuit 40 generates an output voltage having a negative polarity. The output voltages of the positive and negative polarities generated by the pumping circuits 30 and 40 are respectively input to the operational amplifier 50 as the positive and negative power sources. The power source voltage VDD is input from the outside as a reference voltage.

In the circuit constituted as above, even when the threshold of the TFT constituting the pumping circuits 30 and 40 becomes different from a design value due to variations of the fabrication processes, variations of the positive and negative output voltages output from these circuits are regulated by the operational amplifier 50. Specifically, since the variations of the output voltages due to the influences of the TFT fabrication processes can be almost entirely removed in the operational amplifier 50, the output voltages Vg1 and Vg2 can be stabilized. Moreover, the output voltages Vg1 and Vg2 can be set to any value by regulating values of resistors arranged on the output side of the operational amplifier 50.

The operational amplifier 50 shown in FIG. 8 can be combined with the pumping circuit of another embodiment. Also in this case, two pumping circuits, which generate positive and negative output voltages respectively, and the operational amplifier 50 are combined.

Embodiment 4

In the embodiment 4, a constitution will be described in which the external control circuit 102 further realizes a more compact size and lower cost.

Figure 9:
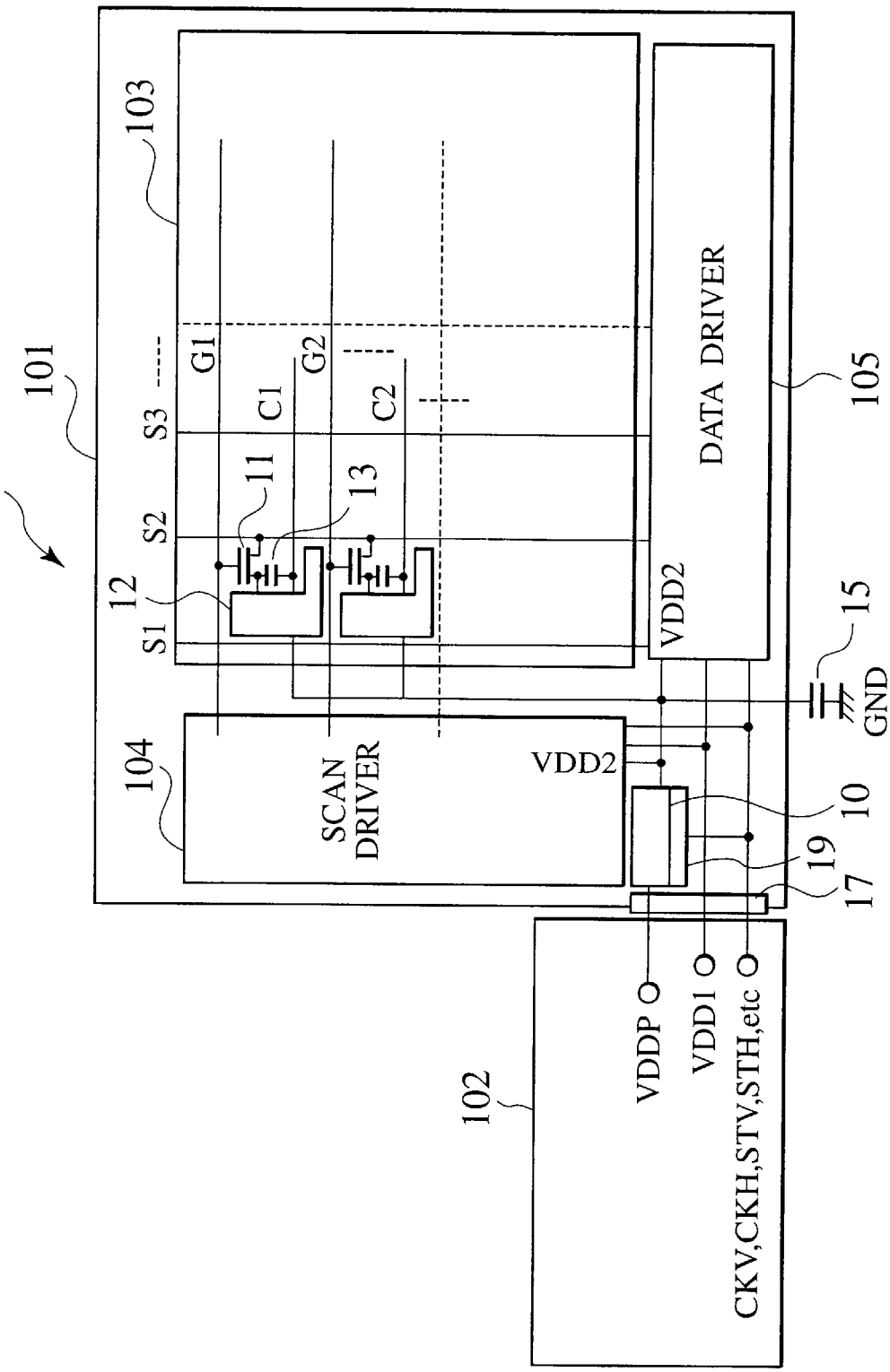
FIG. 9 is a circuit diagram of a liquid crystal display device according to a fourth embodiment of the present invention.

FIG. 9 is a circuit diagram of a liquid crystal display device 200 according to the embodiment 4. FIG. 9 is the circuit diagram which corresponds to that of FIG. 1, and the same constituent components as those of FIG. 1 are represented by the same reference numerals. A basic constitution of the liquid crystal display device 200 according to the embodiment 4 is the same as that of the embodiment 1. Herein, to eliminate redundant descriptions, descriptions for the constitution and the effect common to those of the embodiment 1 are omitted, and a constitution and its effect, which are characteristic of the embodiment 4, will be described.

The pumping circuit 10 receives a supply of a power source VDDP for driving it from an external control circuit 102. The power source voltage VDDP is boosted to VDD2, and then supplied to a scan driver 104 and a data driver 105. A power source voltage VDD1 is supplied to the scan driver 104 and the data driver 105 from a pumping circuit for the power source voltage VDD1 arranged in the external control circuit 102 similarly to the embodiment 1.

The pumping circuit 10 receives a supply of a horizontal clock signal CKH from the external control circuit 102. The horizontal clock signal CKH is boosted to a potential equal to the clock signal CKU of the embodiment 1 by a level shift circuit 19, and then input to the pumping circuit 10. Note that a horizontal start signal STH instead of the horizontal clock signal CKH may be input to the pumping circuit 10, and the horizontal start signal STH may be boosted to the same potential as the clock signal CKU. Although the input side capacitor 16 provided in the clock input portion of the pumping circuit 10 shown in FIG. 1 is not illustrated in FIG. 9, the input side capacitor 16 is actually arranged inside the external control circuit 102 of FIG. 9. Note that when a size of the pumping circuit 10 is small, the input side capacitor 16 may be arranged on the array substrate 101.

The horizontal clock signal CKH supplied from the external control circuit 102 may be directly input to the pumping circuit 10 without passing the horizontal clock signal CKH through the level shift circuit 19. In this case, an amplitude of the horizontal clock signal CKH is previously set to a proper potential.

In the liquid crystal display device 200 according to the embodiment 4, it is unnecessary to supply the clock signal CKU from the external control circuit 102 to the pumping circuit 10. Therefore, even when a location of the pumping circuit 10 is moved onto the array substrate 101, new array input pins needs not to be additionally provided in the external control circuit 102, and a circuit for generating the clock signal CKU needs not to be provided therein.

Accordingly, in the liquid crystal display device 200 according to the embodiment 4, the stabilization of the output voltage can be realized and a more compact size and lower cost of the external control circuit 102 can be realized similarly to the embodiment 1.

Embodiment 5

In the embodiment 5, a constitution will be described in which the external control circuit 102 realizes a more compact size and lower cost and further achieves a lower power consumption.

Figure 10:
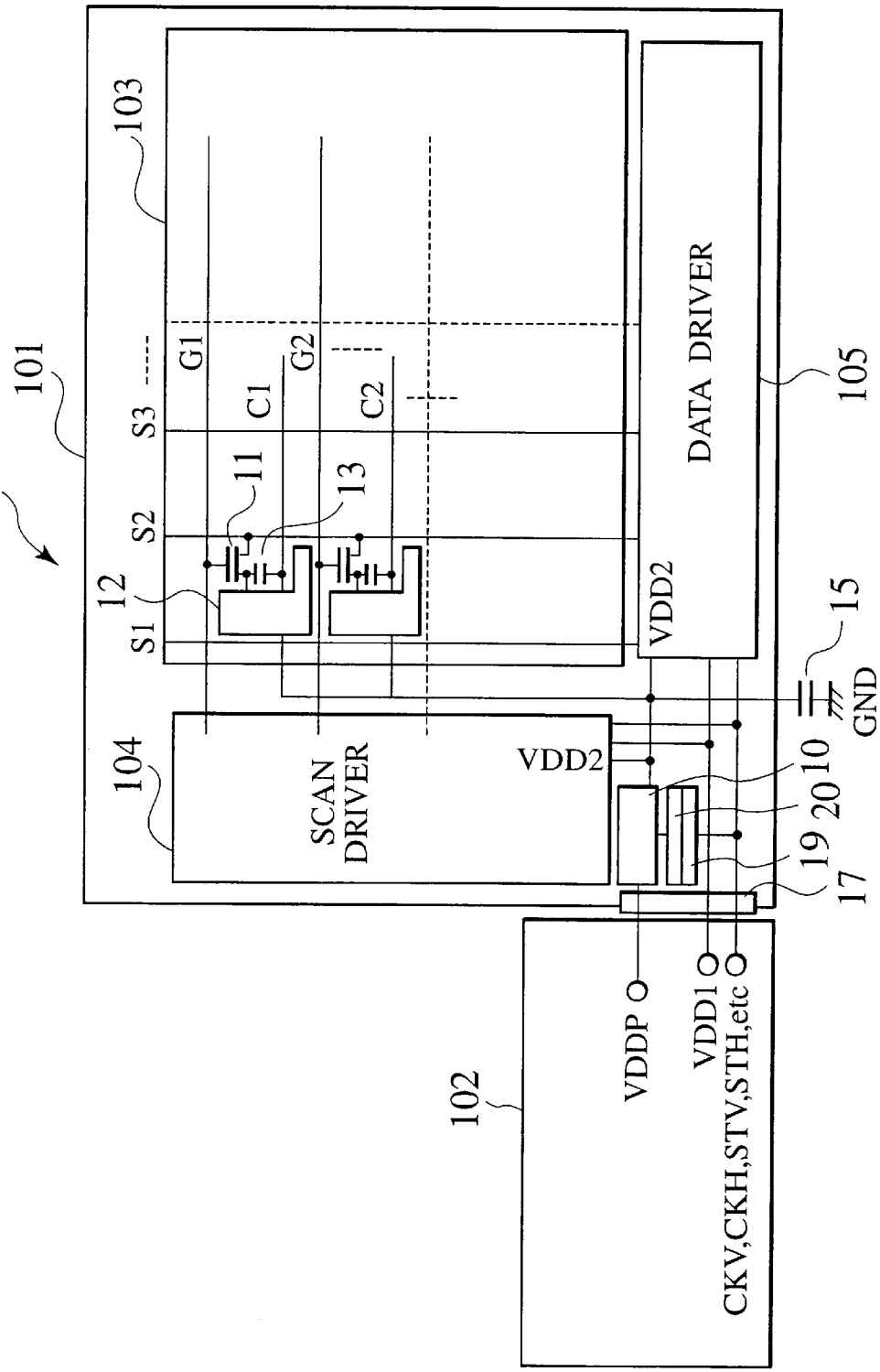
FIG. 10 is a circuit diagram of a liquid crystal display device according to a fifth embodiment of the present invention.

FIG. 10 is a circuit diagram of a liquid crystal display device 300 according to the embodiment 5. FIG. 10 is the circuit diagram which corresponds to that of FIG. 9, and the same constituent components as those of FIG. 9 are represented by the same reference numerals. A basic constitution of the liquid crystal display device 300 according to the embodiment 5 is the same as that of the embodiment 4. Herein, to eliminate redundant descriptions, descriptions for the constitution and the effect common to those of the embodiment 4 and the embodiment 1 are omitted, and a constitution and its effect, which are characteristic of the embodiment 5, will be described.

In the embodiment 5, a frequency dividing circuit 20 is provided between the pumping circuit 10 and the level shift circuit 19. A frequency of the horizontal clock signal CKH, a potential of which has been boosted by the level shift circuit 19, is converted to the most suitable frequency for driving the pumping circuit 10 by the frequency dividing circuit 20. Thereafter, the horizontal clock signal CKH is input to the pumping circuit 10. The frequency of the horizontal clock signal CKH is usually set to be higher than a frequency of the clock signal CKU. Therefore, if the horizontal clock signal CKH undergoes only the processing of boosting its potential, the pumping circuit 10 will be operated with a high frequency. Accordingly, a conversion rate of the frequency dividing circuit 20 is set such that the frequency of the horizontal clock signal CKH is the minimum frequency necessary for driving the pumping circuit 10. Thus, the number of operation times of the pumping circuit 10 is made to be minimum, so that power consumption can be reduced.

In the liquid crystal display device according to the embodiment 5, similarly to the embodiment 4, stabilization of the output voltage from the pumping circuit 10 and more compact size and lower cost of the external control circuit 102 can be realized, and lower power consumption of the pumping circuit 20 can be achieved.

Embodiment 6

In the embodiments 4 and 5, the examples, in which the horizontal clock signal CKH supplied to the data driver 105 is supplied also to the pumping circuit 10, were described. Effects similar to those of the embodiments 4 and 5 can be obtained also by supplying either the vertical clock signal CKV or the vertical start signal STV, which is supplied to the scan driver 104, to the pumping circuit 10.

As a further preferable embodiment, the horizontal clock signal CKH (horizontal start signal STH), which is supplied to the data driver 105, and the vertical clock signal CKV (vertical start signal STV) are together used, and any of these signals may be selectively supplied to the pumping circuit 10. In general, the vertical clock signal CKV and the vertical start signal STV have frequencies lower than those of the horizontal clock signal CKH and the horizontal start signal STH. For this reason, when the pumping circuit 10 is in a standby state in which the circuit 10 is not performing a boosting operation, it is effective that the vertical clock signal CKV or the vertical start signal STV is used. When the pumping circuit 10 is in an activation state in which the circuit 10 is performing the boosting operation, it is effective that the horizontal clock signal CKH or the horizontal start signal STH is used. Thus, the number of operation times of the pumping circuit 10 can be reduced, so that power consumption can be reduced. Switching of these signals from one to another can be realized by, for example, the circuit structure shown in FIG. 11.

Figure 11:
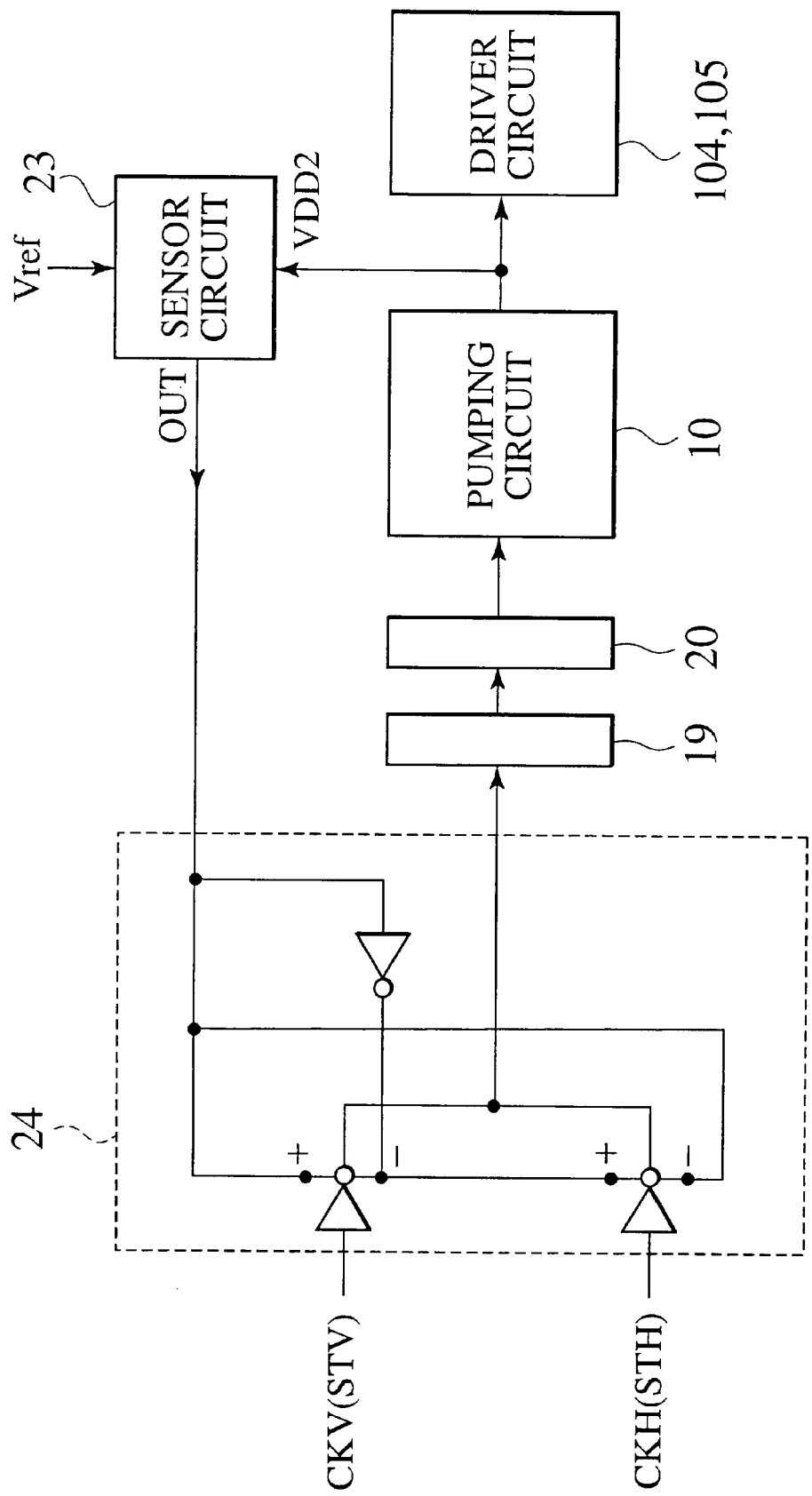
FIG. 11 is a circuit diagram showing a constitution for switching a signal in a sixth embodiment of the present invention.

FIG. 11 is a circuit diagram showing a constitution for switching the signals. In FIG. 11, the same constituent components as those of FIG. 10 are represented by the same reference numerals.

In FIG. 11, a sensor circuit 23 is the one that detects the operation state of the pumping circuit 10. The sensor circuit 23 can be constituted by, for example, a differential amplifier circuit for receiving, Vref and VDD2 in its input terminals. An input switching circuit 24 is the one that switches signals input thereto, in accordance with a level of a signal output from the sensor circuit 23. The input switching circuit 24 can be constituted by, for example, a clocked inverter circuit.

During the operation of the pumping circuit 10, the power source voltage VDD2 output to each driving circuit is kept at a predetermined voltage. However, when the pumping circuit 10 stops the operation, the power source voltage VDD2 drops. The sensor circuit 23 compares Vref and VDD2. If VDD2 is equal to Vref or higher, the sensor circuit 23 outputs a high level signal. If VDD2 is lower than Vref, the sensor circuit 23 outputs a low level signal. The input switching circuit 24 switches the input from the vertical clock signal CKV (vertical start signal STV) to the horizontal clock signal CKH (horizontal start signal STH) if the signal output from the sensor circuit 23 is high in level. The input switching circuit 24 switches the input from the horizontal clock signal CKH horizontal start signal STH) to the vertical clock signal CKV (vertical start signal STV) if the signal output from the sensor circuit 23 is low in level. With such an operation, the vertical clock signal CKV (vertical start signal STV) is selected when the pumping circuit 10 is in a standby state in which the pumping circuit 10 is not performing a boosting operation. The horizontal clock signal CKH (horizontal start signal STH) is selected when the pumping circuit 10 is in an active state in which the pumping circuit 10 is performing the boosting operation. Note that Vref for the sensor circuit 23 is input from the outside. At this time, a desired voltage can be set by regulating a potential by, for example, a resistance divide.

Accordingly, when the circuit structure as shown in the embodiment 6 is adopted, since an optimal signal can be selected in accordance with the operation state of the pumping circuit 10, lower power consumption can be further achieved in the embodiment 6 than in the embodiment 5. The sensor circuit 23 and the input switching circuit 24 shown in FIG. 11 can be applied to the constitution in which only the level shift circuit 19 is provided like FIG. 9.

Embodiment 7

In the embodiment 7, a constitution will be described in which a more compact size and lower cost of the external control circuit 102 are realized.

Figure 12:
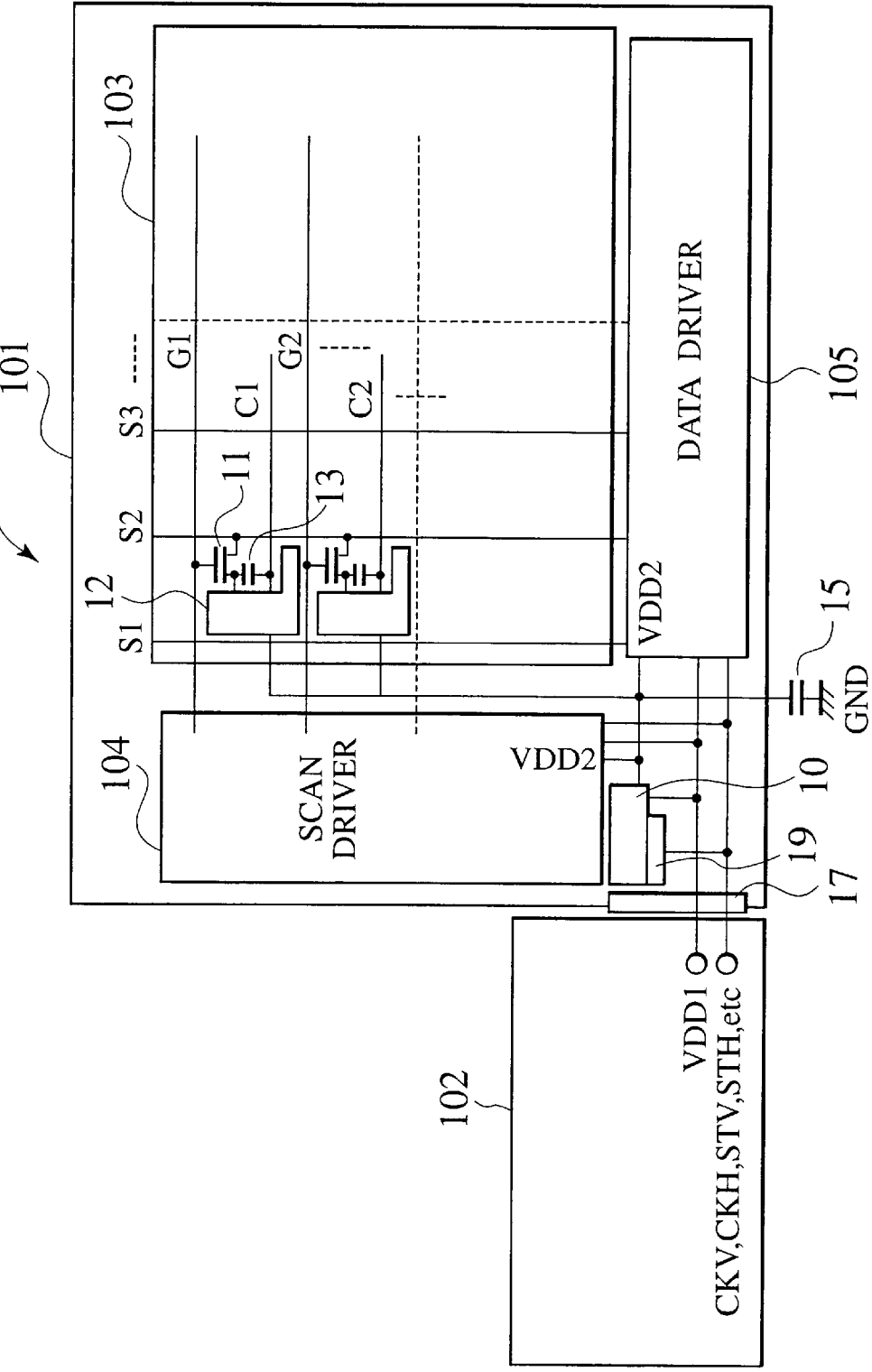
FIG. 12 is a circuit diagram of a liquid crystal display device according to a seventh embodiment of the present invention.

FIG. 12 is a circuit diagram of a liquid crystal display device 400 according to the embodiment 7. FIG. 12 is the circuit diagram which corresponds to that of FIG. 9, and the same constituent components as those of FIG. 9 are represented by the same reference numerals. A basic constitution of the liquid crystal display device 400 according to the embodiment 7 is the same as that of the embodiment 4. Herein, to eliminate redundant descriptions, descriptions for the constitution and the same effects as those of the embodiment 4 and the embodiment 1 are omitted, and a constitution and its effect, which are characteristic of the embodiment 7, will be described.

In the embodiment 7, the power source voltage VDD1 supplied to the scan driver 104 and the data driver 105 is supplied also to the pumping circuit as a power source voltage for the pumping circuit 10. In this case, it is unnecessary to supply the power source voltage VDDP to the pumping circuit 10 from the external control circuit 102 unlike the circuit structure shown in FIG. 9. Therefore, the number of the input power sources from the external control circuit can be reduced.

Accordingly, in the liquid crystal display device 400 of the embodiment 7, a stabilization of an output voltage can be realized similarly to the embodiment 4, and a more compact size and a lower cost of the external control circuit 102 can be realized.

In the case where the frequency diving circuit 20 of the embodiment 5 is combined with the constitution of the embodiment 7, low power consumption can be achieved. By adopting a constitution in which a signal input is selectively switched in accordance with an operation state of the pumping circuit 10 like the constitution in FIG. 11, lower power consumption can be achieved.

Embodiment 8

In the embodiment 8, a constitution will be described in which a pumping circuit can be arranged on an array substrate without enlarging a fringe region.

Figure 13:
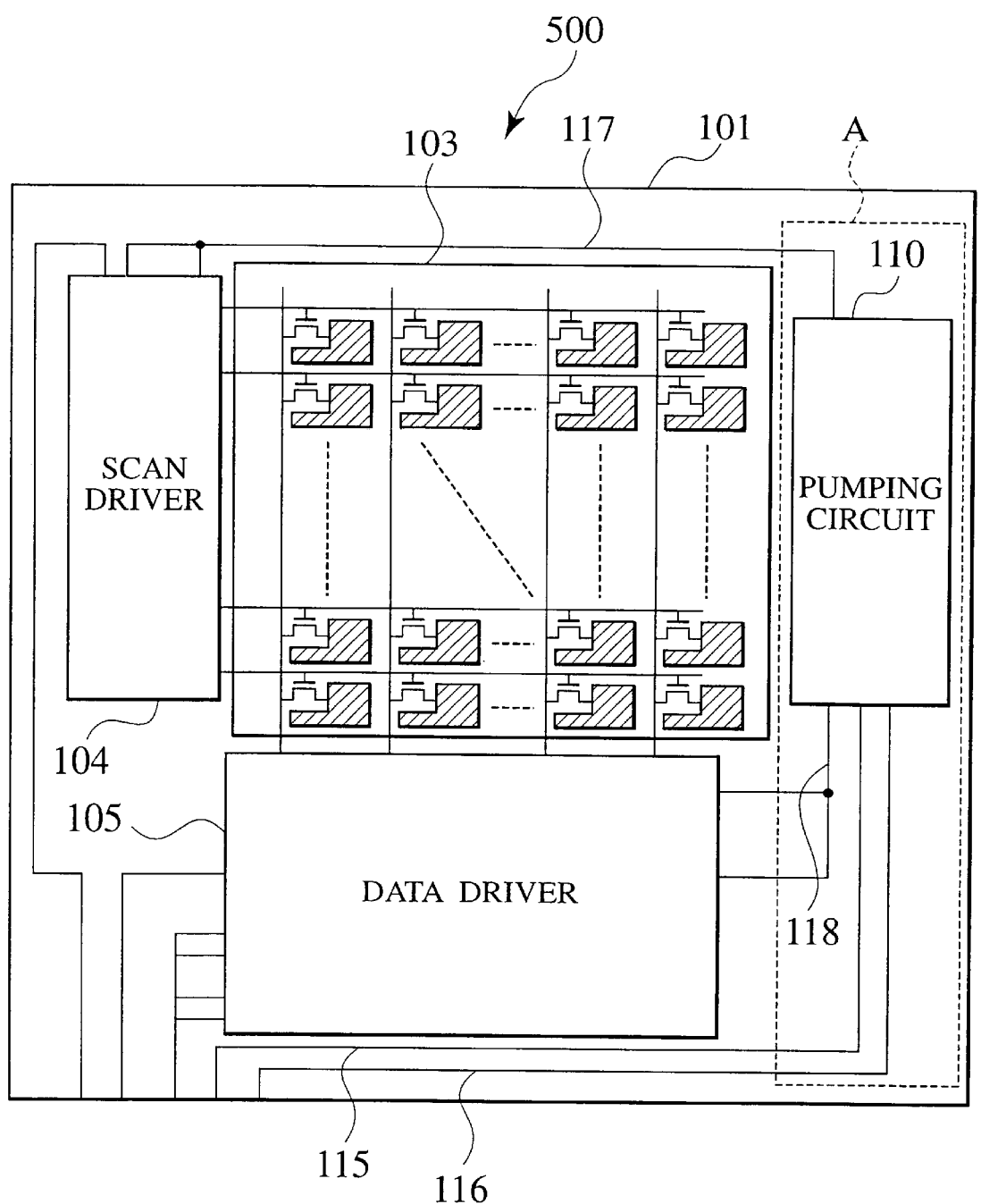
FIG. 13 is a circuit diagram of a liquid crystal display device according to an eighth embodiment of the present invention.

FIG. 13 is a circuit diagram of a liquid crystal display device 500 according to the embodiment 8. FIG. 13 shows a circuit configuration principally on an array substrate. The same constituent components as those of FIG. 1 are represented by the same reference numerals.

The pumping circuit 110 is arranged in a region A an opposite to an area where the scan driver 104 on the array substrate 101 is arranged. A clock signal and a power source voltage from an external control circuit (not shown) to the pumping circuit 110 are supplied through an external signal line 115 and an external power source line 116, and an output voltage from the pumping circuit 110 is supplied to the scan driver 104 and the data driver 105 through internal voltage source lines 117 and 118. An input side capacitor (not shown) provided in a clock input portion of the pumping circuit 110 and an output side capacitor (not shown) provided between an output portion thereof and the ground GND are arranged outside the array substrate 101 similarly to the above described embodiments.

In a general active matrix type liquid crystal display device, the scan driver 104 and the data driver 105 are seldom arranged on both sides of the pixel portion 103, and these drivers 104 and 105 are in many cases arranged in a L character shape so as to interpose the pixel portion 103 therebetween as shown in FIG. 13. The fringe region is secured in the periphery of the pixel portion 103 as an area necessary at the time of mounting. When the pumping circuit 110 is arranged near the scan driver 104 as shown in FIG. 1, a necessity to enlarge the fringe region in this portion occurs. Particularly, in the case where the TFT is formed of polycrystalline Si, when a gate width thereof is made large, also the fringe region must be large.

In the embodiment 8, the pumping circuit 110 is arranged in the region A on the array substrate 101 as shown in FIG. 13. Since a sufficient area is secured for the region A, the pumping circuit 110 can be arrange on the array substrate 101 without enlarging the fringe region. The fringe region needs not to be enlarged even when the pumping circuit 110 is constituted by the TFTs formed of polycrystalline Si and a gate width thereof is made large. As the pumping circuit 110 shown in FIG. 13, the pumping circuit 10 described in the above embodiments can be used. In this case, the input side capacitor and the output side capacitor are arranged either outside the array substrate 101 or in the external control circuit.

Figure 14:
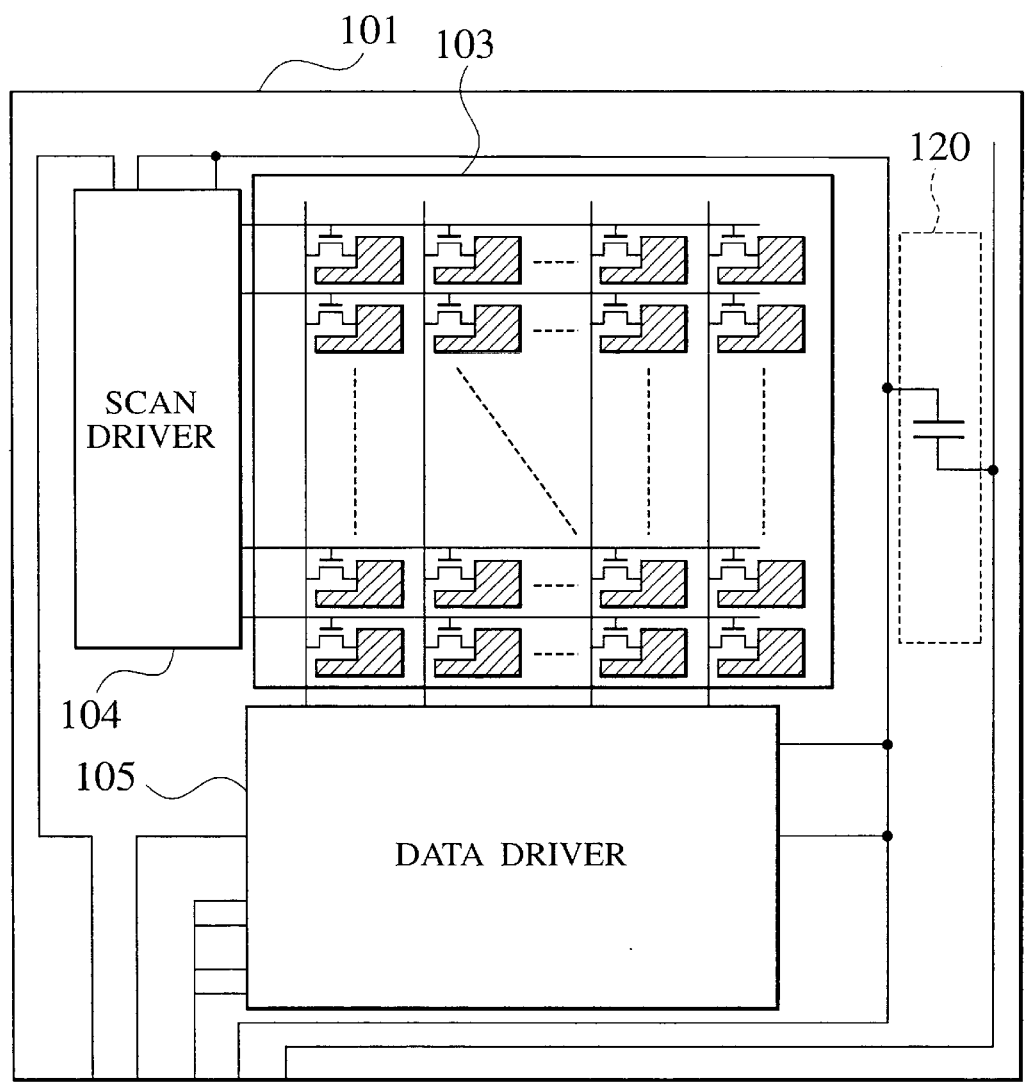
FIG. 14 is a circuit diagram showing an example in which a bypass capacitor is arranged on an array substrate in the eighth embodiment.

FIG. 14 is a circuit diagram showing an example in which a bypass capacitor 120 is arranged instead of the pumping circuit 110. Also in this case, the bypass capacitor 120 can be arranged on the array substrate 101 without enlarging the fringe region. The bypass capacitor 120 means a capacitor for stabilizing the power source voltage.

In the embodiments 1 to 8 described above, the descriptions were made for the case in which the present invention was applied to the liquid crystal display device. However, the display layer is not limited to the liquid crystal layer, but the liquid crystal layer can be replaced with other substance layers. For example, also a fluorescent light emission layer can be used as the display layer. In this case, the present invention can be constituted as an organic EL panel.

What is claimed is:

1. A flat panel display device comprising:

a first substrate including a pluraltiy of scanning lines, and a plurality of signal lines intersecting the scanning lines, a switching element arranged on an intersection point of each of the scanning lines and the signal lines, a pixel electrode connected to said switching element;

a second substrate including an opposite electrode opposite to said pixel electrode;

a display layer held between said first and second substrates;

a data driver which supplies a data signal to each of said signal lines; and a scan driver which supplies a scanning signal to each of said scanning lines, wherein a control signal and a power source voltage are supplied from an external control circuit to said data driver and said scan driver, and wherein at least one pumping circuit having TFTs is arranged on said first substrate, and a first capacitor connected to a clock input portion of said pumping circuit and a second capacitor connected between an output portion and the ground are arranged outside said first substrate.

2. The flat panel display device according to claim 1, wherein at least one of said first and second capacitors is arranged inside said external control circuit.

3. The flat panel display device according to claim 1, wherein a capacitance component of an auxiliary capacitor connected in parallel to said pixel electrode is included in said second capacitor.

4. The flat panel display device according to claim 1, wherein a control signal supplied from said external control circuit to said data driver and said scan driver is supplied also to said pumping circuit.

5. The flat panel display device according to claim 4, said device further comprising:

a level shift circuit for changing a voltage level of the control signal supplied to said pumping circuit to a predetermined voltage level.

6. The flat panel display device according to claim 4, said device further comprising:

a frequency dividing circuit for changing a frequency of the control signal supplied to said pumping circuit to a predetermined frequency.

7. The flat panel display device according to claim 4, wherein said control signal is one of a horizontal clock signal supplied to said data driver and a horizontal start signal supplied thereto.

8. The flat panel display device according to claim 4, wherein said control signal is one of a vertical clock signal supplied to said scan driver and a vertical start signal supplied thereto.

9. The flat panel display device according to claim 4, wherein one of the control signal supplied to said data driver and the control signal supplied to said scan driver is selectively supplied to said pumping circuit in accordance with an operation state of said pumping circuit.

10. The flat panel display device according to claim 9, wherein when said pumping circuit is in a standby state in which said pumping circuit is not performing a boosting operation, the control signal supplied to said scan driver is selected, and when said pumping circuit is an active state in which said pumping circuit is performing the boosting operation, the control signal supplied to said data driver is selected.

11. The flat panel display device according to claim 1, wherein the power source voltage supplied from said external control circuit to said data driver and said scan driver is supplied also to said pumping circuit.

12. The flat panel display device of claim 1, wherein said switching element includes a TFT.

13. A flat panel display device comprising:

a first substrate including a plurality of scanning lines, and a plurality of signal lines intersecting the scanning lines, a switching element arranged on an intersection point of each of the scanning lines and the signal lines, a pixel electrode connected to said pixel electrode;

a second substrate including an opposite electrode opposite to said pixel electrode;

a display layer held between said first and second substrates;

a data driver which supplies a data signal to each of said signal lines; and a scan driver which supplies a scanning signal to each of said scanning lines, wherein a control signal and a power source voltage are supplied from an external control circuit to said data driver and said scan driver, and wherein at least one pumping circuit having TFTs is arranged in a region opposite to a region in which said scan driver on said first substrate is arranged.

14. The flat panel display device according to claim 13, wherein a bypass capacitor is arranged instead of said pumping circuit.

15. The flat panel display device of claim 13, wherein said switching element includes a TFT.

* * * * *